H. L. DAY.
DIRECTION INDICATOR.
APPLICATION FILED JULY 28, 1916.
1,285,638.
Patented Nov. 26, 1918.
2 SHEETS—SHEET 2.
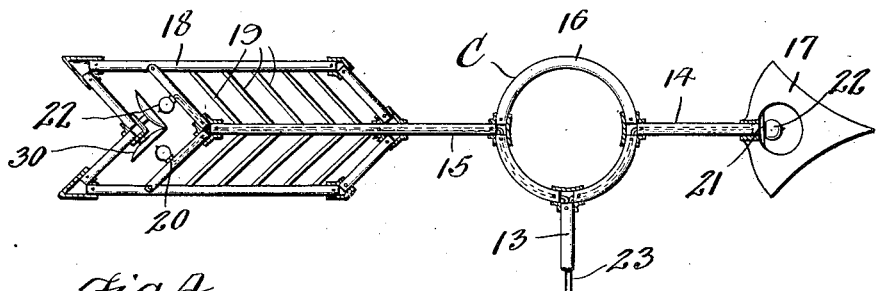
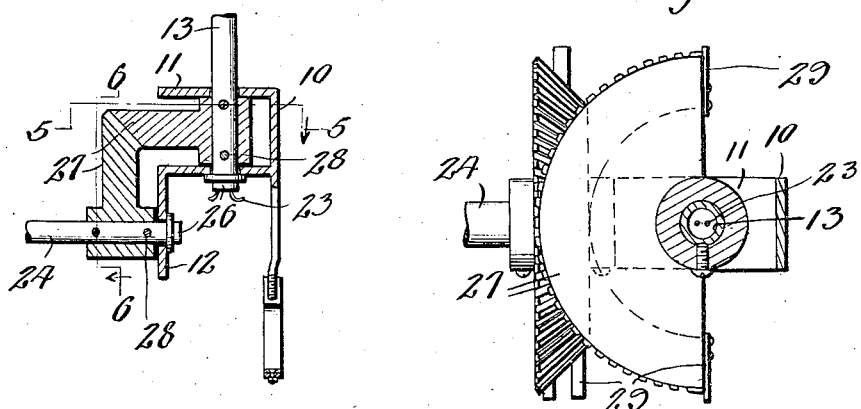
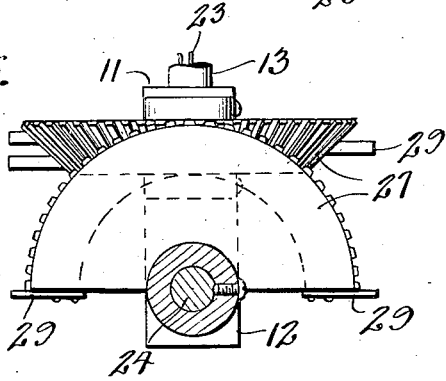
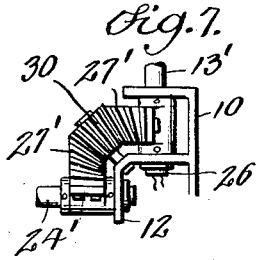
Inventor
H. L. Day,
By Victor J. Evans
Attorney
Witnesses

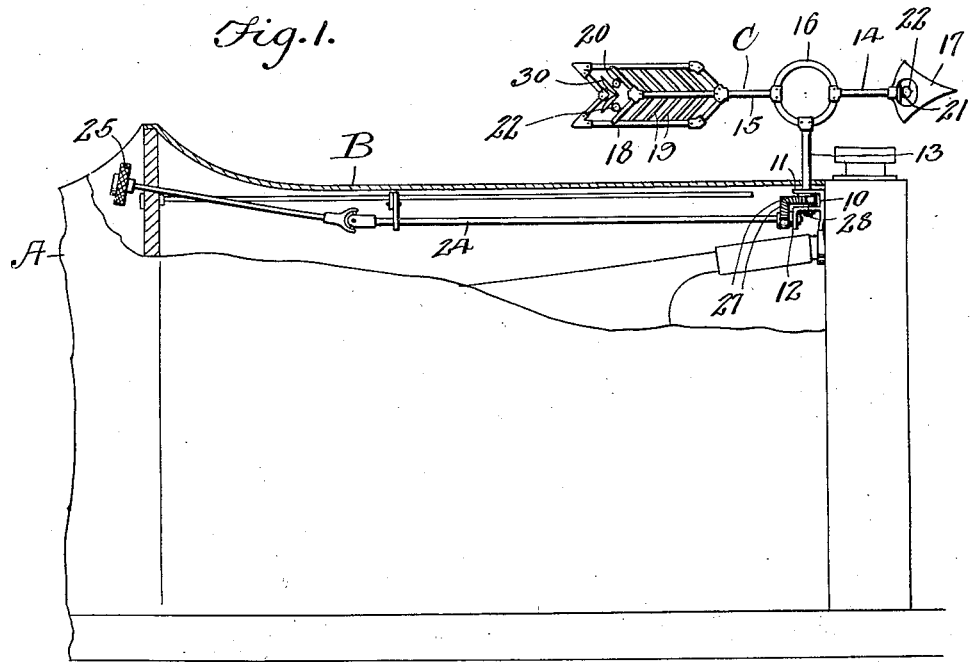
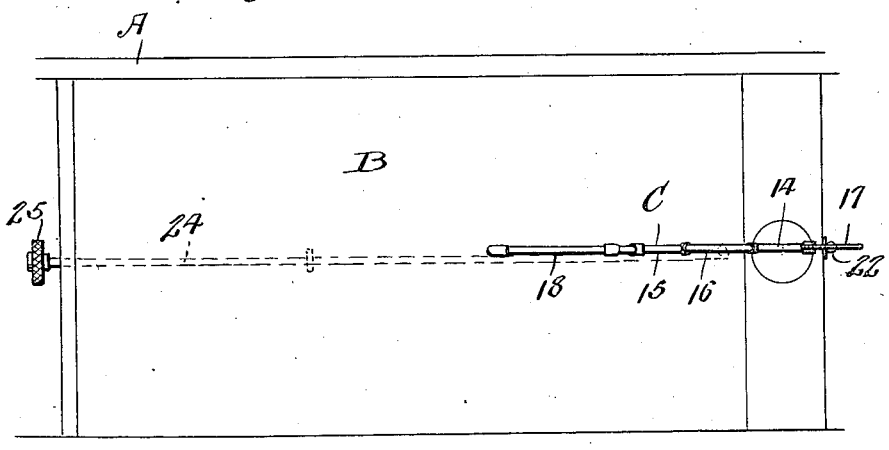

UNITED STATES PATENT OFFICE.

HARRY LIEGH DAY, OF PADUCAH, KENTUCKY, ASSIGNOR OF ONE-HALF TO CHARLES E. RIGLESBERGER, OF PADUCAH, KENTUCKY.

DIRECTION-INDICATOR.

1,285,638.  Specification of Letters Patent.  Patented Nov. 26, 1918.

Application filed July 28, 1916. Serial No. 111,914.

*To all whom it may concern:*

Be it known that I, HARRY L. DAY, a citizen of the United States, residing at Paducah, in the county of McCracken and State of Kentucky, have invented new and useful Improvements in Direction-Indicators, of which the following is a specification.

The invention relates to an indicator, and more particularly to the class of adjustable direction signals or indicators for use on vehicles, automobiles or the like.

The primary object of the invention is the provision of an indicator of this character wherein the same is mounted for movement upon the body of a vehicle, automobile or the like and can be adjusted by the operator thereof so as to indicate the direction of travel thereof to pedestrians and thus obviate the possibility of an accident due to the fact that the pedestrians or the operator of the vehicle, automobile or the like each is unaware of the course of the other.

Another object of the invention is the provision of an indicator of this character wherein the construction thereof is novel in form so that it may be used as a safety device for moving vehicles, automobiles or the like to make visible the intent of the driver thereof to pedestrians as well as traffic policemen, as it will be definitely known whether the vehicle, automobile or the like is to travel straight ahead or make a turn in either direction therefrom.

A further object of the invention is the provision of an indicator of this character which is extremely simple in construction, capable of being illuminated at night so that the same is clearly visible either by day or night, thoroughly reliable and efficient in its operation, strong, durable and inexpensive in manufacture.

Other objects will be in part obvious and in part hereinafter set forth.

The invention accordingly consists in the features of construction, combination of elements and arrangement of parts which will be exemplified in the construction hereinafter described, and the scope of the application of which will be indicated in the appended claim.

In the accompanying drawings:

Figure 1 is a fragmentary side elevation of a motor vehicle showing the indicator constructed in accordance with the invention applied thereto;

Fig. 2 is a fragmentary top plan view;

Fig. 3 is an enlarged vertical longitudinal sectional view through the pointer of the indicator;

Fig. 4 is an enlarged vertical sectional view through the operating mechanism therefor;

Fig. 5 is a sectional view on the line 5—5 of Fig. 4, looking in the direction of the arrow;

Fig. 6 is a sectional view on the line 6—6 of Fig. 4, looking in the direction of the arrow.

Fig. 7 is a fragmentary side elevation showing a slight modification of the gearing.

Similar reference characters indicate corresponding parts throughout the several views of the drawing.

Referring to the drawings in detail, A designates a portion of an automobile which is of the ordinary well known construction and B the hood thereof which is likewise of the usual construction, while C designates generally the indicator hereinafter fully described. The indicator comprises a bracket 10 which is formed with bearings 11 and 12 respectively and is mounted interiorly or exteriorly of the hood B in any suitable manner.

Journaled in the bearings 11 is a vertical staff or standard 13 preferably made of tubing for supporting and turning a pointer comprising the front and rear tube sections 14 and 15 respectively and an intermediate substantially elliptical shaped tubi-form section 16, which parts constitute the body of the pointer and simulate an arrow disposed at right angles to the upright or standard 13 which is fastened at its upper end centrally to the medial section 16 as shown, while on the outer end of the section 14 is the arrow shaped head 17 and upon the rear section 15 is the vane frame 18 having disposed therein throughout a major portion of the same a plurality of rearwardly divergent spaced parallel rods 19 which are engaged in the tube 15 and said frame 18 to form the rib of the vane frame, as will be obvious. Mounted upon the rod 19 adjacent to the tail end of the vane frame 18 is a pair of electric bulb sockets 20, while mounted upon the tube 14 within the arrow head 17 is a single electric light socket 21, and in these sockets is removably mounted the electric light bulbs 22 which are arranged in an electric circuit, the wires 23 of which extend through the tubes 14 and 15 and staff or standard 13 into the body of the motor vehicle A, and this electric circuit is opened and closed in any desirable manner for the illuminating or extinguishing of the electric bulbs 22 which are preferably illuminated at night.

Journaled in the bearing 12 and extended rearwardly of the vehicle A in convenient reach of the operator thereof is an operating rod 24 carrying a hand disk or wheel 25 for the manual turning thereof. The upright or standard 13 in the rod 24 at their ends adjacent each other are formed with screw threads 26, and upon these threaded ends are carried segmental shaped beveled gears 27 which mesh with each other so that on the turning of the rod 24 the upright or standard 13 will be simultaneously turned therewith, thereby adjusting the pointer or arrow to indicate the direction or course of the motor vehicle A, as will be apparent.

The threaded ends 26 carry a lock nut 28 which fastens the gears 27 thereto. Mounted upon one of the gears 27 at the straight edges thereof are stop lugs 29 which limit the throw of the gear relative to the other gear so that in this manner the pointer or arrow is limited in its movement in either direction.

Within the tail end of the vane frame is a shield 30 which prevents the rays of light from the bulbs 22 in the socket 20 from flashing in the face of the operator of the motor vehicle, thereby avoiding the temporary blinding of said operator which would interfere with directing the course of the vehicle.

Upon turning the wheel or disk 25 by hand the pointer or arrow will be turned in the direction desired so as to indicate the intention on the part of the operator as to the direction of travel either in a straight way course or to either side thereof of the motor vehicle, so that pedestrians will know definitely what course the vehicle is to take and thereby obviate accidents. In Fig. 7 there is shown a slight modification of the invention wherein the gears 27' carried by the shafts 13' and 24' respectively have interposed therebetween an idle pinion 30, and these gears and pinions are mounted as shown. It will be apparent that by reason of the arrangement of the gears the indicator can be operated so that when the disk 25 is turned to the right the indicator vane will swing in the same direction and also by turning the disk to the left said indicator vane will swing to the left, and this is contemplated within the range of the invention.

From the foregoing description, taken in connection with the accompanying drawings, the construction and operation of the herein described direction indicator will be readily apparent and, therefore, a more extended explanation has been omitted.

Having thus described my invention, I claim:

An automobile direction indicator comprising a bracket secured upon the inner side of the upper end of the radiator of the vehicle, a vertically extending shaft journaled in said bracket, an arrow mounted upon the upper end of said shaft, a horizontally disposed shaft journaled in said bracket and disposed beneath the hood of the vehicle, an operating rod extending through the dash of the vehicle and provided at one end with a button, a universal joint connection between said horizontal shaft and said operating rod, intermeshing segmental gears secured on the adjacent ends of said shaft, both of said gears being of the same diameter and each being semi-circular whereby said arrow may be moved through an arc of 180°, and strips secured upon the ends of said gears and projecting beyond the teeth thereof for engagement with one another to prevent excessive rotation of said gears.

In testimony whereof I affix my signature.

HARRY LIEGH DAY.